US006801544B1

United States Patent
Rijckaert et al.

(10) Patent No.: US 6,801,544 B1
(45) Date of Patent: Oct. 5, 2004

(54) METHOD OF CONVERTING A PACKETIZED STREAM OF INFORMATION SIGNALS INTO A STREAM OF INFORMATION SIGNALS WITH TIME STAMPS AND VICE VERSA

(75) Inventors: Albert Maria Arnold Rijckaert, Eindhoven (NL); Adrianus Johannes Maria Denissen, Eindhoven (NL); Nicolaas Lambert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/569,615

(22) Filed: May 12, 2000

(30) Foreign Application Priority Data

May 14, 1999 (EP) .............................................. 99201512

(51) Int. Cl.[7] .................................................. H04J 3/24
(52) U.S. Cl. ........................ 370/473; 370/535; 348/512
(58) Field of Search ................................. 370/470, 473, 370/474, 465, 535, 348, 503; 386/65; 348/501, 512

(56) References Cited

U.S. PATENT DOCUMENTS

| | | | |
|---|---|---|---|
| 5,579,183 A | 11/1996 | Van Gestel et al. ........... 360/48 |
| 5,689,507 A | 11/1997 | Bloks et al. ................. 370/389 |
| 5,953,483 A | 9/1999 | Van Gestel et al. ........... 386/65 |
| 6,069,902 A | * 5/2000 | Kurano et al. ............... 370/535 |
| 6,259,694 B1 | * 7/2001 | Sato et al. ................... 370/389 |
| 6,260,170 B1 | * 7/2001 | Lee ............................ 714/769 |
| 6,356,567 B2 | * 3/2002 | Anderson et al. ........... 370/516 |
| 6,359,911 B1 | * 3/2002 | Movshovich et al. ....... 370/536 |

OTHER PUBLICATIONS

The draft Grand Alliance HDTV System Specification, Chapter V, Feb. 22, 1994, D2.

* cited by examiner

Primary Examiner—Chau Nguyen
Assistant Examiner—Daniel K. Lam

(57) ABSTRACT

A method of and an apparatus for converting a packetized stream of information signals representing information arranged in separate, consecutive data packets of digital format, into a stream of information signals with time stamps, includes the feature that after establishing time stamps related to a time of arrival of a data packet, the time stamps of several data packets are grouped into a time stamp packet wherein the size of the time stamp packet is equal to the size of a data unit.

40 Claims, 10 Drawing Sheets

METHOD OF CONVERTING A PACKETIZED STREAM OF INFORMATION SIGNALS INTO A STREAM OF INFORMATION SIGNALS WITH TIME STAMPS AND VICE VERSA

BACKGROUND OF THE INVENTION

1. Field of the Invention

The invention relates to a method of converting a packetized stream of information signals representing information arranged in separate, consecutive data packets of digital format, into a stream of information signals with time stamps, the method comprising receiving the serial stream of information signals, detecting the data packets in the serial stream of information signals while establishing a time of arrival of the data packet, and generating time stamp data related to the time of arrival for each detected data packet.

The invention also relates to a method of converting such a stream of information signals with time stamps into a packetized stream. The invention further relates to converting means for performing both methods, as well to a system for storage and retrieval or transmission of such a stream of information signals.

2. Description of the Related Art

The subject matter, as described in the opening paragraph, is known from International Patent Application WO 96/30905, corresponding to U.S. Pat. No. 5,953,483, Document (D1) in the List Of Documents. More specifically, this document discloses the recording and reproduction of an information signal comprising packets that may arrive irregularly as a function of time in the serial data stream of an MPEG information signal.

Such an MPEG information signal is used for serial transmission of a digital data stream representing a compressed digital video signal and a corresponding compressed audio signal. For instance, the draft Grand Alliance HDTV System Specification dated Feb. 22, 1994, Document (D2) in the List Of Documents, more specifically, chapters V and VI of this specification, contain a description of a transport system for transmitting a MPEG information signal for broadcasting purposes or for transmission via a cable network.

The format of an MPEG information signal has been developed by the Moving Pictures Experts Group (MPEG). This group was established to develop standards for coded representation and compression of moving pictures, audio and their combination. It operates in the framework of the Joint ISO/IEC Technical Committee. Currently produced standards are MPEG-1 (ISO 11172), MPEG-2 (ISO 13818) and MPEG-4. Industries, as well as several international bodies, have adopted these standards. The standards enable interoperability in digital video and audio applications and services.

Within an MPEG serial data stream, the video and/or audio signals may be transmitted via transport stream packets having a fixed amount of bytes (188), the first byte being a synchronization byte. A transport stream packet comprises information of only one of the video signals, or one of the audio signals or one of the data signals transmitted via the MPEG serial data stream.

Synchronization of the decoding and presentation at a receiver is important for a real time digital data delivery system. This is to ensure that a video signal is presented at the proper speed, that video and audio remain synchronized, and that the decoder can properly manage its buffers. A loss of synchronization leads to either buffer overflow or underflow at a decoder, and, as a consequence, loss of information. This is different from analog information, such as, e.g., in NTSC where information for pictures is transmitted in a synchronous manner, so that one can derive a clock directly from the picture synchronization. However, in a digital compression system, the amount of data generated for each picture is variable as dependent on the picture encoding approach and complexity. Thus, timing cannot be derived directly from the start of the picture data. There is no natural concept of synchronization pulses in a digital bit stream. Therefore, the time base at the decoder side must be locked to that of the encoder. The solution is to transmit timing information with selected transport stream packets, to serve as a reference for timing comparison at the decoder.

This is done by transmitting, at regular periods, a sample of a reference clock called program clock reference (PCR). This clock reference (PCR) indicates the expected time of completion of the reading of that timestamp from the bit stream at a decoder. The phase of a local clock running at the decoder is compared to the PCR value at the instant at which it is obtained, in order to adjust the clock rate, if necessary, to determine whether the decoding process is synchronized. A MPEG transport stream can therefore be regarded as a real-time transport stream.

With the use of a second type of time stamp, called decoding time stamp (DTS) or presentation time stamp (PTS), the exact moment, relative to the above-described locked decoder clock, is indicated where a video frame or an audio frame has to be decoded or presented, respectively.

The transport stream packets will be transported across a medium. If the delay of this medium is not equal for each transport stream packet, then it is possible to corrupt the decoding time base. An extra transmission delay between two succeeding transport stream packets that contain a PCR, will cause jitter on a decoder clock. Therefore, only a specific amount of jitter is allowed by the respective standards.

A storage or recording device can also be treated as a transmission channel with infinitesimal delay. At play back, the timing between successive transport stream packets must be in such a way reconstructed that it becomes equal to the timing between succeeding transport stream packets as they arrived at the input of the recording device during recording. Further, it can generally be said that the recording or storage of a complete MPEG information signal, comprising multiple program streams, is not well possible, because of the too high data rate of the MPEG information signal. Therefore, only one or a few of the video signals and their corresponding audio signals, corresponding to a selected program stream, will, in practice, be selected for recording. However, as a consequence, transport stream packets corresponding to a specific program stream will generally be selected on an irregular basis as a function of time.

In order to preserve the timing relation between the subsequent transport stream packets selected, the previously mentioned Document (D1) describes the measure to insert time stamps in each of the transport stream packets recorded. After selection and storage, the timing relation between the subsequent packets with reproduction can be recovered using the time stamps.

According to Document (D1), the combination of time stamps and transport stream packets is incorporated into a specific data format (D-VHS MPEG-2 STD) in which data is recorded with a magnetic playback/recording system, such as a VHS-based digital videocassette recorder. This format is not a standard MPEG format representing a real-time data stream, but allows representing a non-real-time data stream. According to the D-VHS MPEG-2 STD format, recording of signal blocks representing a fixed amount of 112 bytes is allowed. Within two signal blocks of 112 bytes each, one transport stream packet of 188 bytes can be stored together with an additional corresponding time stamp of 4 bytes. (The other 32 bytes are used for other purposes, such as, for example, synchronization, identification, and parity information). This format is only used within a VHS-based digital recorder.

In applications such as can be found in digital home networks, several video/audio and data devices may be interconnected to each other. In a digital home network, digital services may deliver digital content, such as digital video broadcast (DVB), to the home via digital networks using cable, satellite, ether or telephone. Other sources of digital content may be within the home, such as digital camcorders, still cameras and pre-recorded digital media, such as CD and DVD. A digital home network may allow this content to be transported to and between not only an already mentioned D-VHS recorder, but also between set-top boxes, personal computers, television devices, video printers, scanners and the like. An IEEE-1394 network may connect all these devices with each other.

IEEE-1394, as disclosed in "High Performance Serial Bus P1394", draft 7.1 version 1 issued Aug. 15, 1994, IEEE standards department, Document (D3) in the List Of Documents, defines a digital interface for simultaneously transporting multiple, high speed real-time digital audio and video streams between such digital devices. The bus employing such an interface is called 'the IEEE-1394 bus', but is also known as 'Firewire' (Reg. Trademark of Apple) or 'I-Link' (Reg. Trademark of Sony). The standard has been adopted by PC, Consumer Electronic, DVB (Digital Video Broadcast) Industries.

IEEE-1394 defines a packet transport mechanism, but nothing about how to use these packets types for specific real-time data, such as, e.g., MPEG-2. IEC-61883, however, defines how specific AV-formats can be transported with a 1394-bus. IEC-61883 contains to this purpose, among other protocols, a common isochronous protocol (CIP) which is a generic method to pack real-time application data within predetermined bus time slots (isochronous transfer), into the payload field of 1394 bus packets.

However, IEEE-1394, according to the MPEG Transport Stream Protocol IEC 61883-4, is adapted to transport standard MPEG2 transport stream packets of 188 bytes only. There is no space provided within this protocol of the IEEE-1394 standard to transport non-standard MPEG packets of, for example, 192 bytes, such as obtained by adding a time stamp of 4 bytes to each transport stream packet in a non-real-time transport stream such as discussed above.

SUMMARY OF THE INVENTION

An object of the invention is therefore to overcome the above mentioned disadvantage and, more generally, to overcome the problem of adding time stamp data to data packets with a fixed size.

The method according to the invention is thereto characterized by grouping a plurality of the time stamp data of several data packets into a time stamp packet; generating a time stamp packet signal representing the time stamp packet, and transmitting the serial stream of the received information signals together with the generated time stamp packet signals such that a unique association can be established between time stamp data and a corresponding data packet.

The invention is based on the following recognition. By collecting the time stamp data of several data packets into one special time stamp packet, instead of adding each time stamp data to the corresponding data packet, the format according to which these data packets are formatted, such as, for example, MPEG, can be maintained. This has the advantage of avoiding the use of a different format, such as, for example, the D-VHS MPEG-2 STD format. Further, a transfer at a different data rate and/or storage of an MPEG information stream is obtained, as the original order and time relation of the packets can always be restored at a later instant by using the added time stamp information. Also, compatibility with devices and transmission channels, such as the IEEE-1394 bus based on standard MPEG formats, is maintained.

In a method where the data packet comprises a fixed number of N digital data units and the time stamp data comprises M digital data units with M<N, a further advantageous method according to the invention is characterized in that the time stamp data packet comprises N digital data units.

By maintaining this size of N data units, a time stamp packet can also be regarded as a standard packet in a standardized stream of packets. The time stamp packet will fit in the reserved space according to a transmission format, or in a receiving device adapted to process packets of fixed amount of digital words. For example, no special measures have to be taken with transmission channels based on IEEE-1394. Furthermore, devices not adapted to modify the stream of packets, may handle a time stamp packet as one of the other packets and will not require modification.

It is noted that not all data units in a time stamp packet need to be used for time stamps, as data units may also serve as data stuffing units or as synchronization units.

A further advantageous method according to the invention is characterized by providing the time stamp packet with identifying information. This has the advantage that a receiving device can discriminate a time stamp packet from other, non-standard packets that might be present in a received stream of packets.

A more detailed first method according to the invention is characterized by providing time stamp data in the time stamp packet with associated information indicating the corresponding data packet. This has the advantage that, at reproduction of the real-time stream, when data is missing or not correct, still a link between a specific time stamp and a data packet might be established. Furthermore, the sequence of data packets may be changed.

An alternative second, more detailed method according to the invention is characterized by providing time stamp data in the time stamp packet in an order in accordance with an order of transmission of the corresponding data packets. In this way, the separate time stamps in a time stamp packet can be associated with corresponding data packets. For example, the n-th time stamp in a specific time stamp packet has to be associated with the n-th data packet of a group of data packets following the time stamp packet. This has the advantage that no additional identifying information has to be added.

A further advantageous method according to the invention is obtained by grouping only those time stamp data into a time stamp packet which corresponds to data packets which constitute, with the time stamp data packet, a logical block of combined data packets as employed for coding or decoding purposes. This requires less modification of the organization of a transport stream while existing handling and processing of the data stream in logical blocks is followed. Advantageous in this respect is a method according to the invention characterized in that the logical block of combined data packets corresponds to a block as employed for error coding or error correction.

If a sequence of data packets represents a coded video picture, a further advantageous method is characterized in that the first data packet of a picture corresponds with the first data packet of a logical block of pictures, such as, for example, in the case of a coded sequence of I-, P- and B-pictures in MPEG video coding. For subsequent processing, it is advantageous to coincide a start of an I-, P- or B-picture with the start of a time stamp packet.

Another advantageous method is obtained in the case that a sequence of data packets represents coded video pictures, is characterized in that the logical block of data packets is selected in accordance with a group of video pictures. Such as, for example, a Group of Pictures, denoted as GOP in MPEG video coding.

A next advantageous method according to the invention is characterized by using a time stamp packet signal for time synchronization of a receiving device. By recognizing a time stamp packet signal as a sync packet, no additional sync signals have to be added.

In a preferred method according to the invention, a synchronization signal is transmitted preceding transmission of a logical block of data packets. This enables easy recognition of the start of a logical block.

When the data packets are formatted according to an MPEG transport stream packet of N=188 bytes, an advantageous method according to the invention is obtained by grouping time stamp data into a time stamp packet of N=188 bytes. It is noted that not all bytes in a packet need be employed for data or time stamps, as a transport stream packet or a time stamp packet may comprise both a header part and a payload part.

BRIEF DESCRIPTION OF THE DRAWINGS

These and other aspects of the invention will be apparent from and elucidated further with reference to the embodiments described hereafter, as illustrated with the accompanying drawings, in which:

FIGS. 6A–6G illustrate adding additional time stamps to transport stream packets;

DESCRIPTION OF THE PREFERRED EMBODIMENTS

Transmission of digital information signals can be found increasingly in digital home networks where digital services deliver digital content to the home via digital networks using cable, satellite, ether or telephone. Or where other sources of digital content may be within the home, such as digital camcorders, still cameras and pre-recorded digital media, such as CD or DVD.

Figure 1:
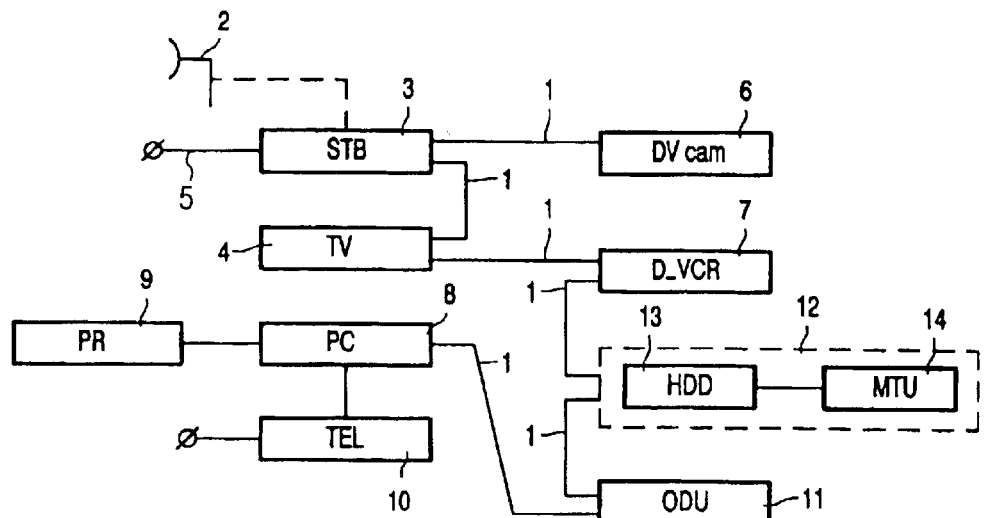
FIG. 1 shows a typical cluster in a home network with several digital audio/video devices connected with each other by an IEEE-1394 network.

A digital home network allows this content to be transported to and between devices, such as D-VHS recorders, set-top boxes, PCs, DV camcorders, video printers, scanners, and the like. A typical cluster is given in FIG. 1 where an IEEE-1394 network 1 connects several digital devices with each other. The cluster comprises a satellite receiver 2 for receiving digital video broadcast signals. The satellite receiver 2 is connected to a set-top box 3 that is adapted to receive digital signals from satellite (DVB) and submitting these signals to either a television device 4 or to a magnetic playback/recording system, such as digital VCR recorder 7, for storage. Further digital information signals may be provided to the set-top box 3 by cable or telephone via input terminal 5 or by a digital camcorder 6. Further digital information signals may also be provided by a personal computer 8, a printer 9, a telephone device 10, an optical drive unit 11 employing, for instance, a Digital Versatile Disc (DVD) or a Compact Disc (CD), and a mass storage unit 12. This mass storage unit 12 comprises a fast access memory, such as a hard disk drive 13, and a large storage memory, such as a magnetic tape unit 14. Alternatively, an optical drive may be employed.

MPEG-2 provides a two layer multiplexing approach. The first layer is dedicated to ensure a tight synchronization between video and audio. This layer is called packetized elementary stream PES. The second layer is dependent on the intended communication medium. The specification for error-free environments, such as local storage, is called MPEG-2 program stream PS, while the specification addressing error-prone environments is called MPEG-2 transport stream TS.

Figure 2:
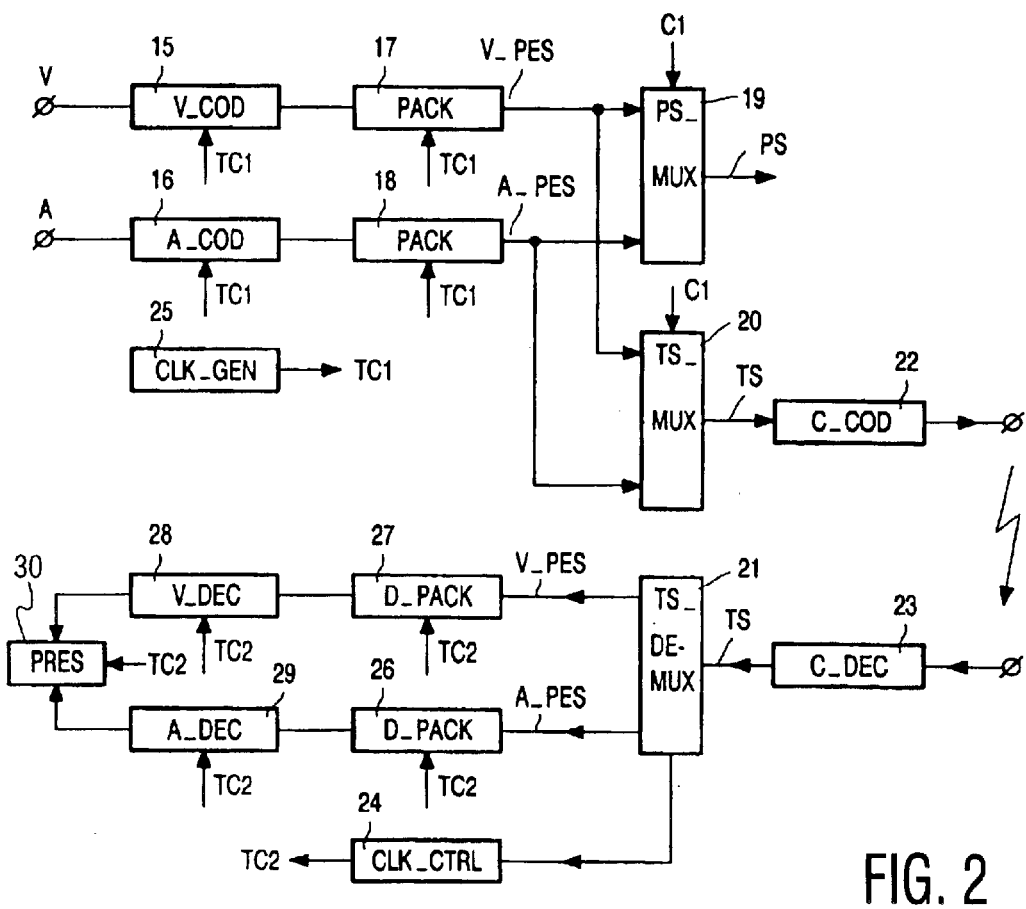
FIG. 2 illustrates means for encoding and decoding audio and video information according to the MPEG-2 format.
Figure 3A:
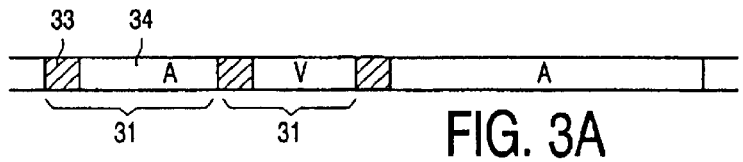
FIGS. 3A and 3B show a MPEG-2 program stream and a MPEG-2 transport stream.
Figure 3B:
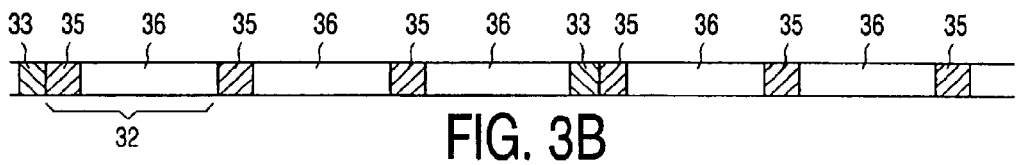

FIG. 2 illustrates this approach for encoding video and audio data with a video encoder 15 and an audio encoder 16, respectively. With a first subsequent packetizer 17, a video packetized elementary stream V-PES is obtained, while with a second subsequent packetizer 18, an audio packetized elementary stream A-PES is obtained. Both bit streams are submitted to a program stream multiplexer 19 for generating a program stream PS, and to a transport stream multiplexer 20 for generating a transport stream TS. Within a program stream PS, the program elementary stream packets (PES packets) from various elementary bit streams are multiplexed by transmitting the bits for complete PES packets in sequence resulting in variable length transport packets. FIG. 3A illustrates such a variable length transport packets in the form of a PES-packet 31 comprising a program elementary stream header 33 and a program elementary stream packet payload 34. In contrast, in the transport stream, the PES packets are transmitted as the payload of fixed length transport packets. FIG. 3B illustrates fixed length transport packets 32, each of which comprises a transport packet header 35 which includes information for bit stream identification and the transport packet payload 36. It is noted that a transport stream may carry several programs where the video and audio data are multiplexed together. The transport stream is channel encoded by a channel coder 22 in order to obtain transmission signals adapted for transmission via a transmission channel. It is noted that, generally, a transmission channel may not only comprise a cable or broadcasting channel, but also storage means, like magnetic or optic media.

At a receiver site, data corresponding to a program is separated by a transport stream demultiplexer 21 from the received multiplexed stream using specific information contained in a not further specified program association table and program map table. A channel decoder 23 subsequently regenerates the transport stream TS which is demultiplexed by a transport stream demultiplexer 21 into a video packetized elementary stream V-PES and an audio packetized elementary stream A-PES. These streams are further depacketized by depacketizers 26 and 27 into separate packets again and finally decoded by video and audio decoders 28 and 29 for real-time presentation on a presentation device 30.

These elementary streams may be tightly synchronized (as it is usually necessary for digital TV programs, or for digital radio programs), or not synchronized (in the case of programs offering downloading of software). To this purpose, an MPEG information signal contains clock reference data (such as SCR in case of MPEG-1, or PCR in case of MPEG-2) in order to synchronize at the receiving device a local clock 24 generating timing control signals TC2, with a local clock 25 at the transmitting device generating timing control signals TC1. This clock reference data is send periodically, e.g., every 100 ms. The in-between distance, in time, between succeeding packets in a MPEG signal transmitted between such two clock reference signals, should be fixed to a high degree. An MPEG stream is therefore a real-time stream.

Figure 4:
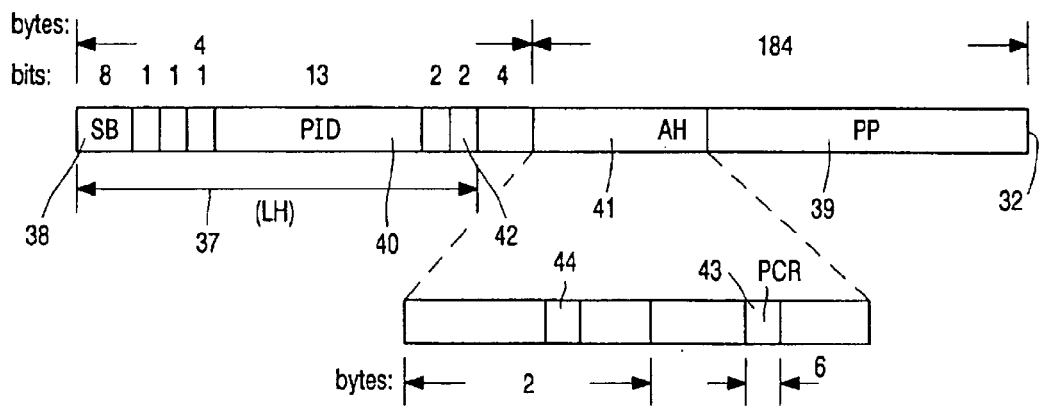
FIG. 4 shows part of the format of a transport stream packet of a transport stream.

For a detailed explanation of the contents of the fixed length transport packet 32 in FIG. 3B, referral is made to Document (D2) in the List of Documents, more specifically, chapter V, while FIG. 4 shows, schematically, the main characteristics. Hereafter, a fixed length transport packet 32 will be referred to as simply a transport packet 32. In FIG. 4, the transport packet 32 is illustrated having a fixed length of 188 bytes. The transport packet 32 comprises a transport packet header (reference 32 in FIG. 3B) containing a link header 37 of 4 bytes long, and optionally an adaptation header 41 of variable length. The remaining bytes are reserved for the transport packet payload 39. The choice of this packet size is motivated by several reasons, such as required overhead, probability of packet error correction, compatibility with the block sizes of typical block oriented, error correction approaches and interoperability with the ATM format.

The first byte in the link header 37 is a sync byte 38 that may be used for packet synchronization. The sync byte 38 is identical for all the transport packets. The other three bytes in the link header 37 comprise identifying information, such as a packet identifier 40. This provides the mechanism for multiplexing and demultiplexing bit streams by enabling identification of packets belonging to a particular elementary or control bit stream. An adaptation header flag 42 flags a presence of the optional adaptation header 41 in the link header 37. The adaptation header 41 may comprise a PCR field 43 representing timing information to lock a time base at a receiver site with that of a transmitting site. A PCR flag 44 flags the presence of this PCR field 43. This timing information is regularly transmitted, at least once every 100 milliseconds, in the form of a sample of a 27 MHz clock as a reference time stamp, which indicates the expected time of completion of the reading of the PCR field 43 from the bit stream at the receiver. The phase of the local clock running at the receiver is compared to the value contained in the PCR field 43 at the instant at which it is obtained, to determine whether a decoding process is synchronized. In general, the value contained in the PCR field 43 (PCR value) from the bit stream does not directly change the phase of the local clock but only serves as an input to adjust the clock rate of the decoder (nominal 27 MHz). The cycle time of the PCR value is approximately 26 hours. The format of the PCR field 43 contains 33 bits and another 9 bit extension field. This extension field cycles from 0 to 299 at 27 Mhz, at which point, the value in the 33-bit field is incremented by one. (This results that this field is a compatible 33-bit field that is used for the 90 KHz clock in MPEG-1)

The transport stream will be transported across a medium. If the delay of this medium is not equal for each transport stream packet, then it is possible to corrupt the decoding time base. An extra transmission delay between two succeeding transport stream packets that contain a PCR-field 43, will cause jitter on the 27 MHz decoder clock. Therefore, ISO/IEC 13838 allows only a specific amount of jitter.

Figure 5:
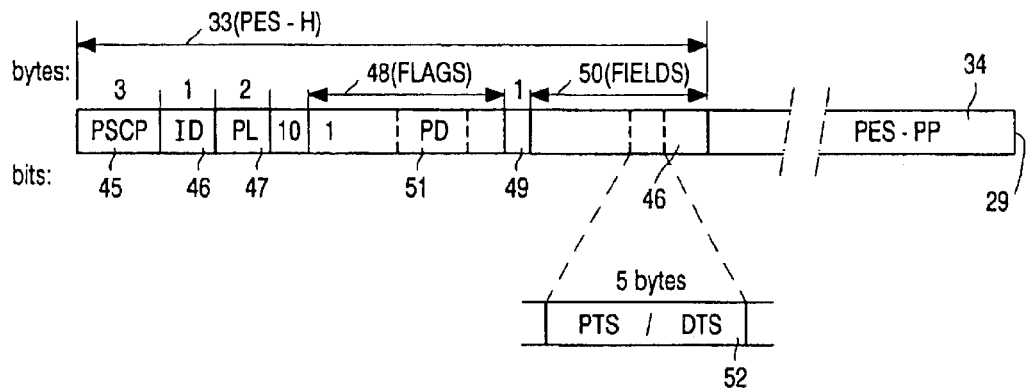
FIG. 5 shows the format of a program header of a program stream.

The exact moment, relative to the above described time reference contained by the described PCR field 43, where a video frame or and audio frame has to be decoded or presented, respectively, is indicated by a second type of time stamps. These are called decoding time stamp (DTS) or presentation time stamp (PTS). These fields are contained in the PES headers 33 (FIG. 3B) preceding a PES packet and are transmitted contiguously as the packet payload 39 (FIG. 4) of fixed length transport packets 32 in a transport stream. New PES packet data always start a new transport packet, and PES packets that end in the middle of a transport packet are followed by stuffing bytes for the remaining length of the transport packet. The format of a PES-packet 31 is illustrated in FIG. 5

The PES-packet of FIG. 3A comprises a PES header 33 and a PES packet payload 34. The PES header 33 comprises a packet start code prefix 45, a stream identifier 46, a PES packet length field 47, PES header flags 48, a PES header length field 49 and a PES header fields 50. The PES header flags 48 flag the presence of specific PES header fields 50. A 2-bit flag 51 indicates whether a presentation time stamp (PTS) or decoding time stamp (DTS) is present in the PES header 33 in the form of a DTS/PTS field 52. The PTS/DTS field 52 comprises 33 bits.

Note that a clock from the channel coder 22 or channel decoder 23 shown in FIG. 2, is set completely independent from the clock from the video encoder 15, audio encoder 16, video decoder 28 and audio decoder 29.

Furthermore, transmission of such an MPEG information signal in the form of recording on and reproduction from a record carrier, such as a magnetic record carrier, or to a storage device, such as a hard disk drive, requires special measures to be taken in order to maintain the real-time information. Reference is made in this respect to European Patent Application EP-A 0 858 230, corresponding to U.S. Pat. No. 5,579,183, Document (D4) in the List Of Documents.

At play back, the timing between succeeding transport stream packets must be reconstructed in such a way that it becomes equal to the timing between succeeding transport stream packets as they arrived at the input of the recording device during record. Additionally, as explained earlier, such a MPEG transport stream can include more than one video program. As the bit-rate of the MPEG transport stream is normally higher than the bit-rate of the signal that can be recorded, only one video program may be selected from the serial MPEG transport stream for recording. Selection of one video program means selection of transport packets out of the MPEG transport stream that comprise the information relating to said video program, and deleting the other transport packets.

Figure 6A:
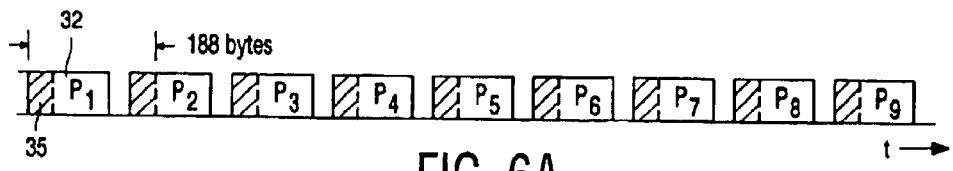
Figure 6B:
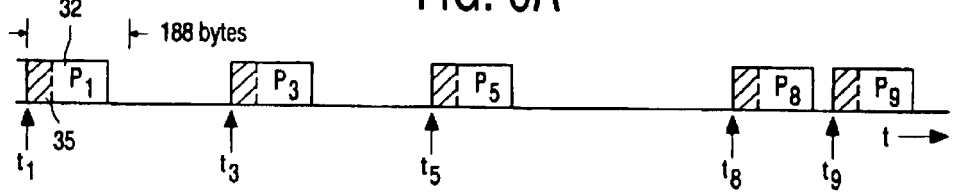
Figure 6C:
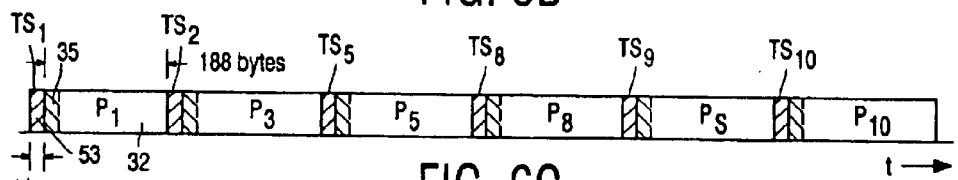
Figure 6D:
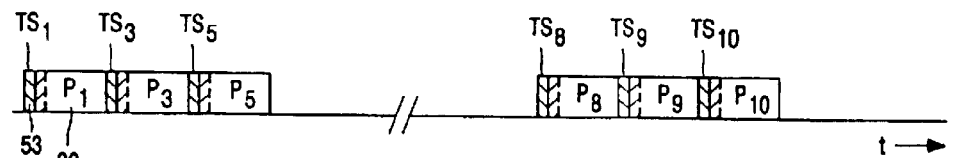

FIG. 6A shows a serial MPEG transport stream as a function of time t comprising transport packets 32 ($P_1$, $P_2$, . . . ). As shown already in FIGS. 3A and 3B, each transport packet 32 comprises a transport packet header 35. Selecting only those transport packets 32 that include information relating to a video program selection, results in the selection of, as an example, the selected transport packets $P_1$, $P_3$, $P_5$, . . . as depicted in FIG. 6B. The intermediate transport packets $P_2$, $P_4$, $P_6$ . . . will be thrown away. As a result, a data stream has been obtained in the recording arrangement for recording on the record carrier, as shown in FIG. 6B, which shows the data stream as a function of time. At time instants $t_1$, $t_3$, $t_5$, $t_8$, $t_9$ . . . , representing the time of receipt of each of the corresponding selected transport packets $P_1$, $P_3$, $P_5$, $P_8$, $Pg_9$ . . . , additional (with respect to the earlier mentioned DTS and PTS values) time stamps $TS_{1, Ts3}$, $TS_5$, $TS_8$ . . . are generated. These additional time stamps may comprise a count value, comprising, for example, 4 bytes, of a counter that is capable of counting in subsequent count cycles from a start value. The generated additional time stamps are added to the corresponding transport packets 32 as shown in FIG. 6C with reference 53. Also illustrated in FIG. 6C is a smoothing introduced in order to obtain a lower bit-rate required for recording or storing. Alternatively, FIG. 6D shows bursts of composite transport packets 32 and additional time stamps 53, as required by writing/reading in bursts to/from a storage medium, like a hard disk drive.

Figure 7:
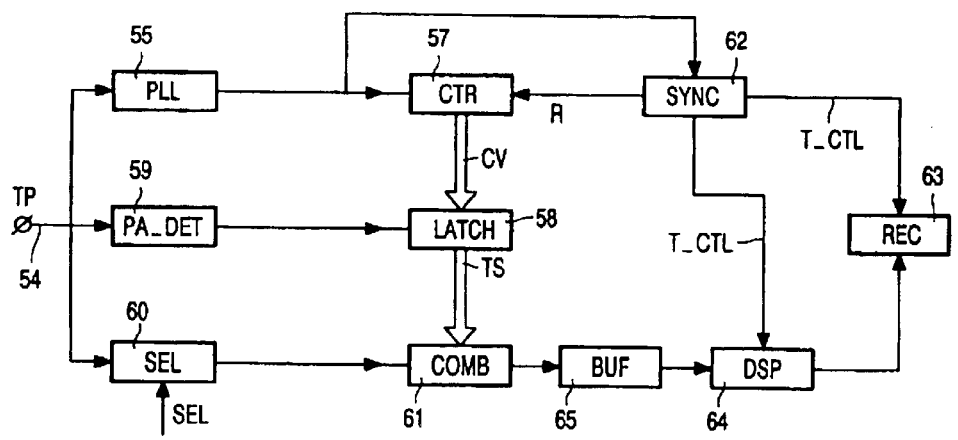
FIG. 7 schematically depicts a device for recording a MPEG-2 transport stream.

FIG. 7 illustrates, schematically, a recording apparatus for recording a real-time MPEG-2 stream as known from Document (D4) in the List Of Documents. The input terminal 54 is coupled to a phase-locked loop circuit 55 that locks onto synchronization words, such as the PCR clock information included in the MPEG transport packets. The phase-locked loop circuit 55 generates a clock signal with an oscillation frequency of the same frequency as the incoming MPEG signal, that is, roughly 27 MHz. This clock signal is supplied to a counter 57. This counter 57 counts up (or down) with this frequency and generates cycles of count values CV, initiated by a reset pulse R. The count value CV of the counter 57 at the time of arrival of a transport packet TP is available at the output of a latch circuit 58. To this purpose, the transport packets TP are also inputted to a packet arrival detector 59 for determining the time of arrival $t_i$ of a transport packet $P_i$. Further, the transport packets TP are inputted to a selection unit 60 for selection of a user specified program with corresponding selected transport packets. The selection unit 60 is coupled to a combining unit 61 for combining the selected transport packets with the corresponding additional time stamps TS generated from latch circuit 58. A synchronization circuit 62 is present for supplying further timing. This synchronization circuit 62 receives clock pulses of the phase-locked loop circuit 55 and supplies reset pulses to the counter 57. Further, the synchronization circuit 62 supplies timing control pulses T-CTL to the recording unit 63 and the digital signal processing unit 64. These timing control pulses T-CTL indicate, for example, a track start for the tape of the recording unit 63. The digital signal processing unit 64 performs the channel coding required for the recording in the recording format with the recording unit 63. Finally, a smoothing buffer 65 is present between the combining unit 61 and the digital signal processing unit 64.

Figure 8:
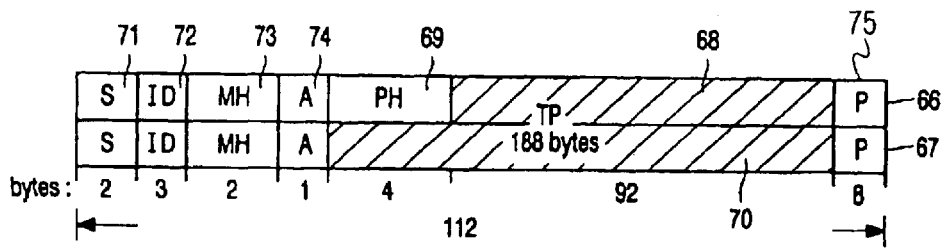
FIG. 8 shows the format for storage of transport stream packets according to the D-VHS MPEG-2 STD format.

The composite transport packets must be written into a tape format as disclosed in Document (D4) in the List Of Documents. Data is written to the tape in units of sync blocks with a fixed length of 112 bytes. Two consecutive sync blocks are used to store one transport packet with its additional time stamp. FIG. 8 illustrates this format. The first sync block 66 contains the first part 68 of the transport stream packet and the additional time stamp as a packet header 69. The second sync block 67 contains the second part 70 of the transport stream packet. The sync blocks 66 and 67 are further containing synchronization words 71, identifying information 72, a main header 73, auxiliary data 74 and parity information 75 according to the D-VHS MPEG-2 format.

Figure 9:
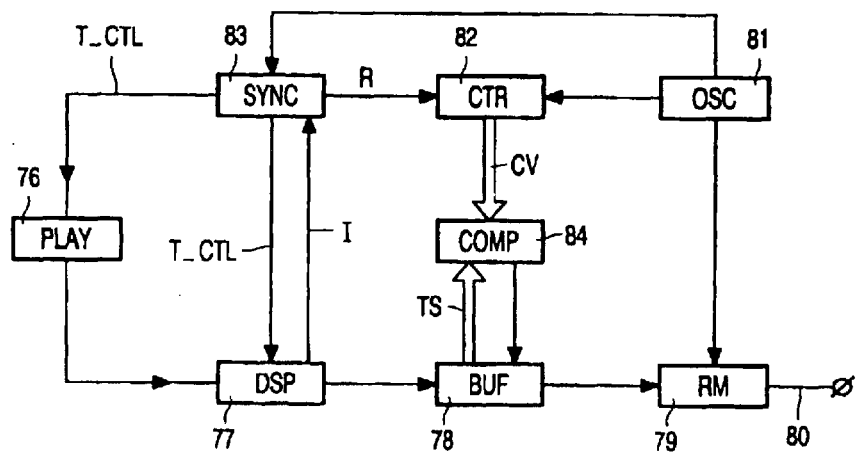
FIG. 9 schematically depicts a device for reproducing a MPEG-2 transport stream.

FIG. 9 illustrates, schematically, a device for reproducing a MPEG-2 transport stream as also known from Document (D4) in the List Of Documents. The reproducing device shows much resemblance with the recording device of FIG. 7. The recorded signal, comprising the channel encoded composite time-stamped packets according to the format shown in FIG. 8, is read from a record carrier by means of a playback unit 76. This signal is supplied to a digital signal processing circuit 77 for channel decoding to obtain the composite packets. The composite packets are inputted to a buffer unit 78 for buffering and desmoothing. The time stamps are removed from the composite packets by removing circuit 79 so as to obtain the original transport packets. The original transport packets are supplied to the output terminal 80 in dependence of the time stamps. An oscillator circuit 81 is present and supplies clock pulses based on an oscillation frequency, for example, of 27 MHz, to a counter 82 and a synchronization circuit 83. This oscillation frequency should be substantially equal to the oscillation frequency of the recording device. The counter 82 counts up (or down) with this frequency and generates cycles of count values CV to a comparator 84. The comparator 84 further receives the time stamp TS retrieved from the time-stamped packets, from the buffer unit 78. Upon coincidence of a time stamp value TS with a count value CV, a coincidence signal is generated by the comparator 84 and fed to the buffer unit 78. The transport packet, that comprises the time stamp for which a coincidence is established, is supplied to the output terminal 80 in response to the coincidence signal. The synchronization circuit 83 further generates time control information (T-CTL), such as a track start signal, to the digital signal processing circuit 77 as well to the playback device 76, and a reset signal R to the counter 82. It is noted that the synchronization circuit 83 receives additional timing information from the playback device via the digital processing circuit 77.

Alternatively to recording and reproducing, a real-time MPEG transport stream may be transmitted between digital devices via a bus operating with an IEEE 1394 protocol, such as defined in Document (D3) of the list of references. One single 1394-bus can connect up to 63 devices or 'nodes', using only point-to-point connections. Each 'node' has a unique address that is assigned to itself after establishing its position in the network. In order to make 1394 work like a bus, each device acts as a 'repeater' where data is written directly into the corresponding memory space or read from it.

There are two categories of data traffic allowed on the bus: asynchronous and isosynchronous traffic. Asynchronous data traffic employs data packets with a full 64-bit target address and is mostly used for memory read, write and lock operations. For real-time data, an isochronous transfer mode is used. The 64-bit address is then replaced by a 6-bit virtual channel number. Any receiver can then receive data from any channel. All nodes capable of isochronous transfer must maintain a 32-bit clock. One node is selected to be 'cycle-master'. Every 125 $\mu$s, this node sends a special packet containing the value of its own clock, which is used by all other nodes to synchronize their own clock: 'global bus time'. This can be used to create constant end-to-end transport delays for real-time data, such as MPEG-2 transport packets.

It is noted that IEEE-1394 defines only a packet transport mechanism, but nothing about how to use these packets types for specific classes, such as, e.g., MPEG-2. IEC-61883, however, defines how specific audio/video-formats can be transported with a 1394-bus. IEC-61883 contains, to this purpose, three main components: a common isochronous protocol (CIP), a connection management protocol (CMP) and a function control protocol (FCP). CIP is a generic method to pack real-time application data into the payload field of isochronous 1394 bus packets. A special CIP header is inserted at the start of each payload to indicate how the application-level data was packed. Time stamps attached to the application packets allow delivery with constant transport delay. The CMP provides a peer-to-peer mechanism for setting up and maintaining isochronous connections. FCP provides a framework by means of which high-level commands can be communicated.

Figure 10:
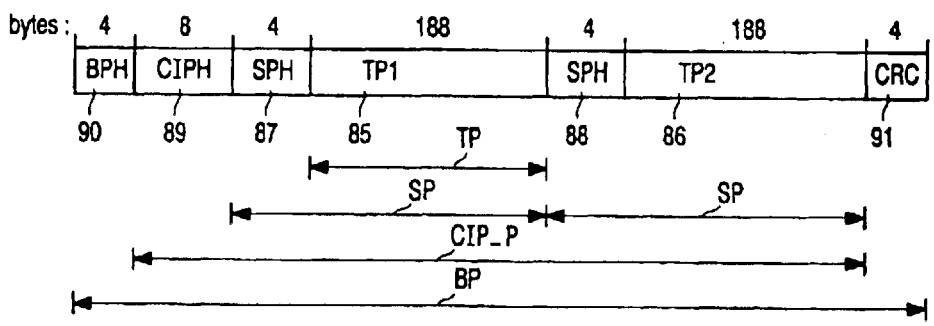
FIG. 10 shows the format of a bus packet.

FIG. 10 shows such a format for transporting transport packets over a 1394-bus. The included transport packets 85 and 86 each comprises 188 bytes. The time of arrival of these transport packets 85 and 86 at a source device, before transmitting over the bus, is preserved in time stamps contained in the source packet headers 87 and 88, each 4 bytes long. A combination of a transport packet 85 and 86, and a source packet header 87 and 88, respectively, is called a source packet SP of 192 bytes. The source packets SP are preceded by the CIP header 89. The combination of the CIP header 89 and the source packets SP is called a CIP packet. The combination of the CIP packet with a preceding bus packet header 90 and a terminating CRC word 91 is called a bus packet or isochronous packet BP.

Figure 11:
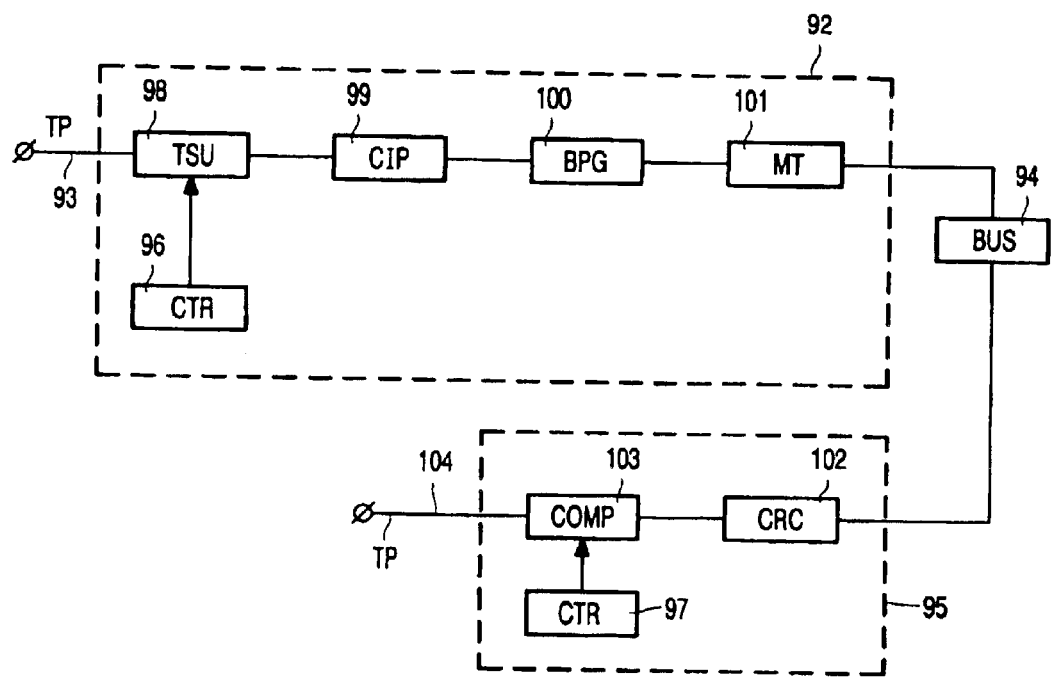
FIG. 11 illustrates a transport of a MPEG transport stream packet over an IEEE-1394 bus using bus packets of FIG. 10.

According to this protocol, when a source device has to transmit real-time transport packets, it requests a time slot on the bus. According to the bus protocol, a particular time slot, from a periodically repeating set of time slots, is then allocated to the source device. However, if the source device merely passes an MPEG signal, but does not create it, it will need to buffer an incoming MPEG transport packet until the beginning of the time-slot in which it can be transmitted. This means that the included synchronization information, such as SCR values in case of MPEG-1, or PCR-values in case of MPEG-2, will no longer correspond to the time of transmitting these signals. This would mean that these values could not be used to synchronize a decoder of a receiving device. This can be corrected by including an additional clock in the source device, which is synchronized to the incoming MPEG transport packets. This additional clock is sampled at an instant corresponding to the instant at which the SCR or PCR signal is transmitted in the time slot that is allocated for transmission according to the bus protocol. The sample value is used to replace the SCR or PCR value in the MPEG transport packets. For a more detailed description, referral is made to International Patent Application WO 96/01540, corresponding to U.S. Pat. No. 5,689,507, Document (D5) of the List Of Documents, relating to transmission of packets via a signal bus. However, it may be regarded disadvantageous that for this correction, the source device has to interpret the MPEG transport packets in order to locate the SCR or PCR values. Document (D5) shows also a system for avoiding this and which is schematically shown in FIG. 11.

A source device 92, adapted to receive MPEG transport packets TP at an input terminal 93, is connected via a bus 94 to a destination device 95. Both the source device 92 and the destination device 95 comprise clocks 96 and 97, respectively. The clocks 96 and 97 are synchronized to each other, for example, in response to signals that are periodically created on the bus 94 by a time master apparatus that may be connected to the bus 94. The source device 92 comprises a time stamping unit 98 that adds time stamps generated by the clock 96 to the received transport packets TP upon reception of these packets. These time stamps are inserted in the source packet header 88 (FIG. 10). The resulting source packets SP are supplied to a CIP unit 99 that inserts CIP headers 89 into the source packets SP in order to obtain CIP packets CIPP. A bus packet generator 100 generates a bus packet header 90 and a CRC-word 91 in order to obtain a bus packet BP. The bus packets BP are temporarily stored in the transmitter buffer 101 until they can be transmitted. Subsequently, in the time slot allocated according to the bus protocol, the bus packet BP is transmitted in combination with the sampled value of the clock 96. This bus packet BP is received by the destination device 95 and stored, via a CRC-checking unit 102, into a compensating buffer 103 until the clock 97 of the destination device 95 exceeds the time stamp of clock 96 transmitted with the included transport packet by a predetermined delay value. In this way, the timing of the signal produced by the source device 92 is reproduced with the delay value, which is chosen at least as large as the maximum delay that can be caused by waiting for the time slot allocated to the source device 92 according to the protocol used for the bus 94. In this way, the start of each transport packet TP will remain outputted at output terminal 104 with a proper timing.

If, additional to the time stamps present in the source packet headers, further time stamps have been added to the MPEG transport packets of 188 bytes, in case of recording and reproducing devices shown in FIGS. 7 and 9, the resulting length of 192 bytes will not fit in the known format according to IEC-61883 for transmitting transport packets over an IEEE-1394 bus.

Figure 12:
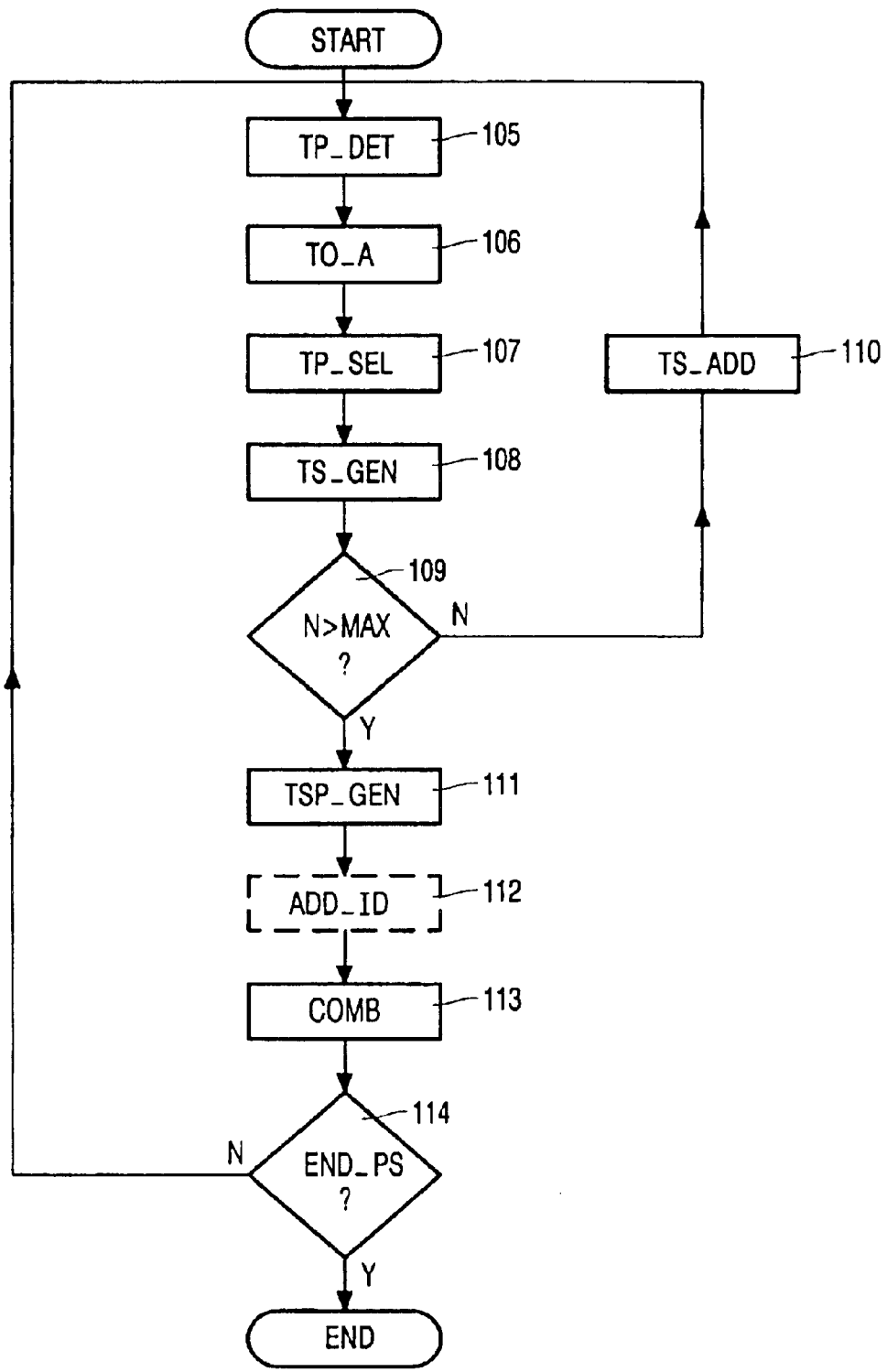
FIG. 12 shows a flowchart for adding time stamps to a real-time stream according to the invention.

Therefore, the flowchart of FIG. 12 shows a method, according to the invention, for adding such further time stamps to a real-time stream. First, detection of (step 105) and establishing a time of arrival (TO-A) (step 106) of transport packets takes place. Then, selection of transport packets belonging to a selected program stream takes place (step 107). A corresponding time stamp is subsequently generated (step 108) representing the time of arrival. Then, it is checked whether the number N of generated time stamps exceeds a specific amount (step 109). This amount may be variable depending on the size of logical blocks of data packets to be processed or on the start of such blocks. A time stamp packet need not to be filled completely with time stamps, but may be completed with stuffing bytes. If this is not the case, the generated time stamp is added to a time stamp packet containing several time stamps of other transport packets (step 110) and the next transport packet is being selected again (step 105). The specific format of such time stamp packets is explained in more detail with reference to FIGS. 16A–16G. Otherwise, the number N is reset to zero and a time stamp packet signal is generated (step 111) representing the generated and in step 110 collected time stamps so far. Optionally, (step 112) identification information ID may be added to the time stamp packet signal for identification purposes. The generated time stamp packet signal is combined (step 113) with the corresponding previously selected transport packets (step 105) into a stream of serial packets of both transport packets and time stamp packets. Finally, it is determined (step 114) whether all transport packets of the selected program stream have been handled. In case of handling a transport packet that does not end the program stream, the next transport packet is selected (step 105).

Figure 13:
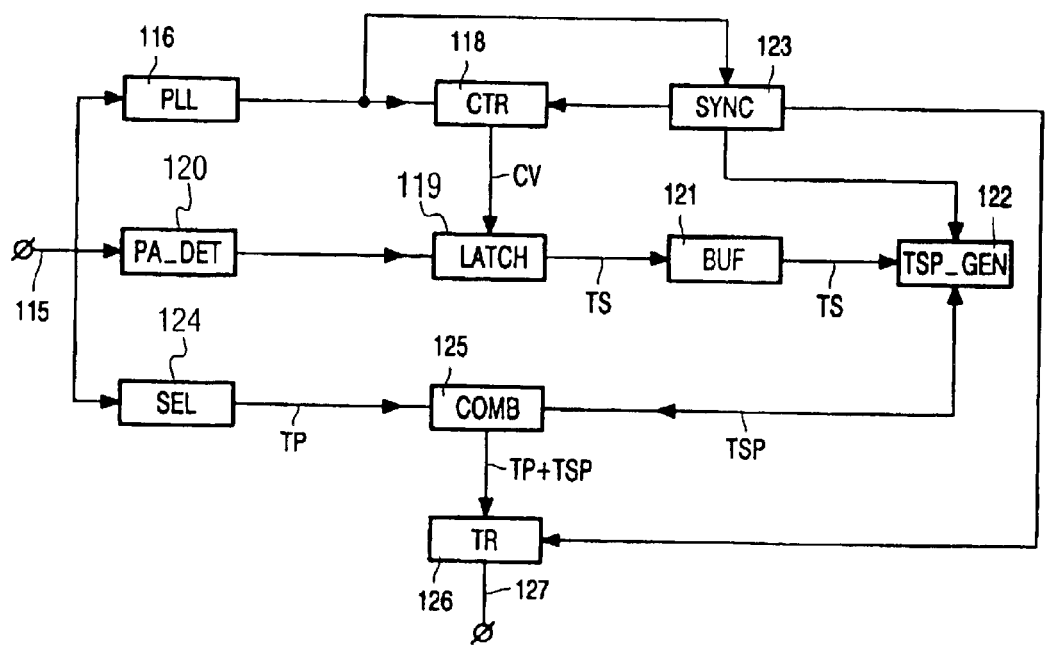
FIG. 13 shows, schematically, converting means according to the invention for performing the method illustrated in FIG. 12.

FIG. 13 shows, schematically, converting means according to the invention for performing the method illustrated in FIG. 12. An input terminal 115 is coupled to a phase-locked loop circuit 116 which locks onto synchronization words, such as the PCR clock information included in the MPEG transport packets. The phase-locked loop circuit 116 generates a clock signal with an oscillation frequency of the same frequency of the incoming MPEG signal, that is, roughly 27 MHz. The clock signal is supplied to a counter 118. This counter 118 counts up (or down) with this frequency and generates cycles of count values CV, initiated by a reset pulse R. The count value CV of the counter 118 at the time of arrival of a transport packet is available at the output of a latch circuit 119. To this purpose, the transport packets are also inputted to a packet arrival detector 120 for determining the time of arrival of a transport packet. A sequence of generated count values CV, representing the time of arrival of the transport packets, are stored in buffer means 121 for temporary storage. A time stamp packet generator circuit 122 constitutes a combined packet of the time stamps temporarily stored in the buffer means 121 according to the method described in FIG. 12. This may also involve adding association information to the time stamps for association with the corresponding transport packets, or identifying information for identification of the time stamp packet itself.

A synchronization circuit 123 is present for supplying further timing. This synchronization circuit 123 receives the clock signal of the phase-locked loop circuit 116 and supplies reset pulses to the counter 118. Further, the synchronization circuit 123 supplies timing control to the time stamp packet generator 122. The transport packets are further inputted to a selection unit 124 for selection of a user-specified program with corresponding selected transport packets. The selection unit 124 is coupled to a combining unit 125 for combining the selected transport packets with the corresponding times stamp packets generated by the time stamp packet generator 122. The combined stream of transport packets and time stamp packets is supplied to transmission means 126 for transmitting the packets. The transmission means 126 is adapted to the transmission channel involved. As an example, the transmission means may incorporate bus transmission means for constituting bus packets, such as described in FIG. 10, for transmission via an IEEE-1394 bus. The transmission signals are available at an output terminal 127. Optionally, the synchronization circuit 123 may further supply the transmission means 126 with timing information to employ the time stamp packets also for synchronization purposes.

Figure 14:
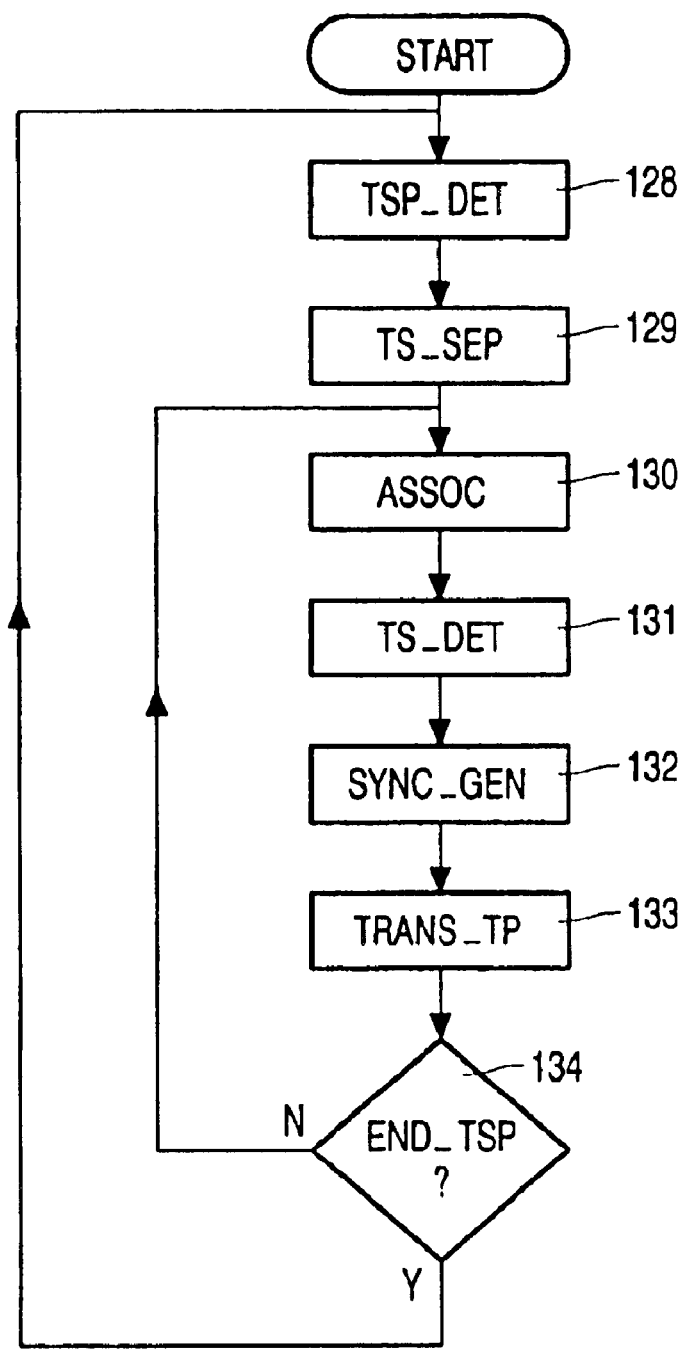
FIG. 14 shows a flowchart for separating time stamps of a non-real-time stream according to the invention.

The flowchart of FIG. 14 shows a method for separating time stamps of a non-real-time stream according to the invention. First, the time stamp packets within a serial stream of time stamp packets and transport packets are detected (step 128). Then, separation of the time stamps in a detected time stamp packet is performed (step 129). The separated time stamps are associated (step 130) with the corresponding transport packets. For each transport packet, the time stamp is determined (step 131), while a synchronization signal is generated (step 132) using the generated time stamp and a clock reference. This synchronization signal is used to transmit (step 133) the corresponding transport packet at the time represented by the time stamp in order to obtain the real-time stream of transport packets again. Finally, it is determined (step 134) to proceed either with the next time stamp in the selected time stamp packet (step 130) or with the detection of a subsequent time stamp packet (step 128).

Figure 15:
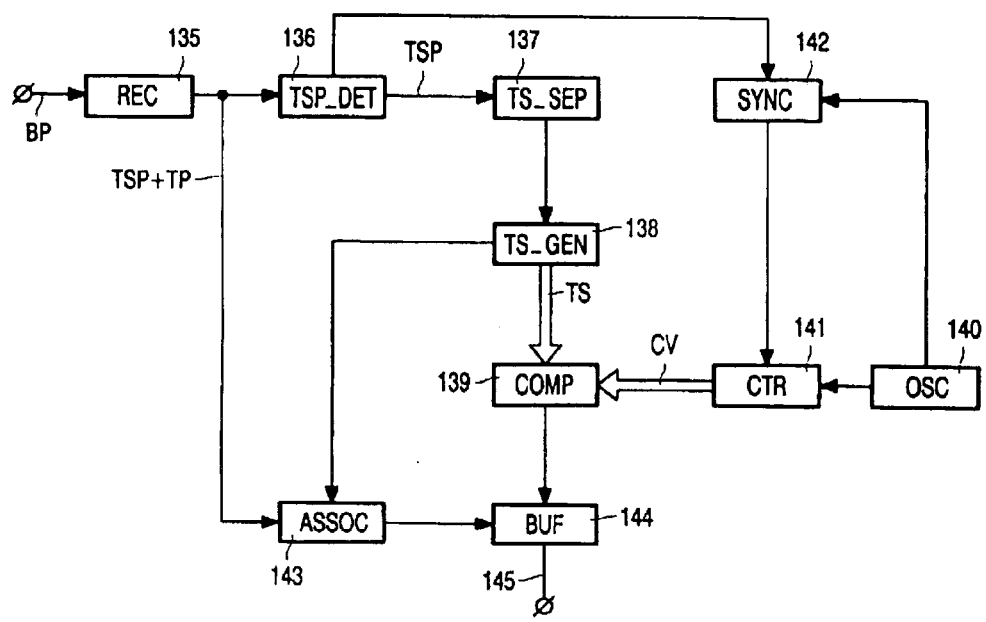
FIG. 15 shows, schematically, converting means according to the invention for performing the method illustrated in FIG. 14.

FIG. 15 shows, schematically, converting means, according to the invention, for performing the method illustrated in FIG. 14. A serial stream of transport packets TP and corresponding time stamp packets TSP, such as generated, for instance, by the converting means described in FIG. 13, is received by receiving means 135. The receiving means 135 may be adapted for receiving IEEE-1394 bus packets BP, such as described in FIG. 10, with the above-mentioned packets as payload. Within this stream, the time stamp packets are detected by time stamp packet detecting means 136. The time stamps are separated in time stamp separating means 137 and supplied to time stamp generating means 138 for generating the represented time stamp TS. This value is supplied to a comparator 139.

An oscillator circuit 140 is present and supplies clock pulses based on an oscillation frequency, for example, of 27 MHz, to a counter 141 and a synchronization circuit 142. This oscillation frequency should correspond to the oscillation frequency of the converting means, such as, for example, described in FIG. 13, employed for converting the original real-time stream of transport packets to a non-real-time stream. The counter 141 counts up (or down) with this frequency and generates cycles of count values CV to a comparator 139. Upon coincidence of a time stamp value TS with a count value CV, a coincidence signal is generated by the comparator 139 and fed to the buffer unit 144. This buffer unit 144 stores the transport packet TP associated previously by associating means 143 To this purpose, the associating means 143 receives the transport packets TP from the receiving means 135, and associating information from the time stamp generation means 138. The transport packet associated with the time stamp for which a coincidence was established, is supplied to the output terminal 145 in response to the coincidence signal. Synchronization circuit 142 may further receive synchronization information from the time stamp detection means 136.

Figure 16A:
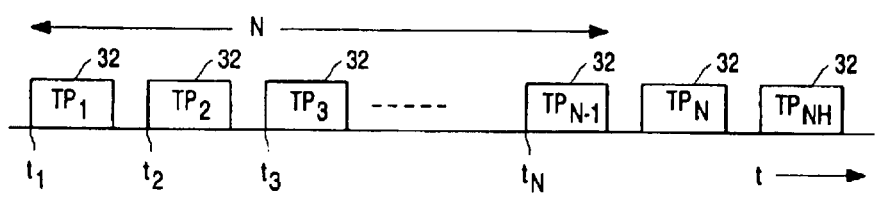
FIGS. 16A–16G show several methods according to the invention of grouping time stamps into time stamp packets.

FIGS. 16A–16G show several methods, according to the invention, of grouping time stamps into time stamp packets. FIG. 16A schematically depicts a real-time stream of transport packets 32 (TP$_1$, TP$_2$, . . . ) received at time instants t$_1$, t$_2$, . . . .

Figure 16B:
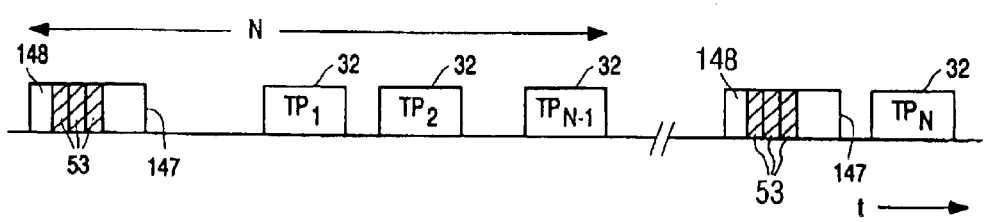

FIG. 16B shows a first method of grouping N time stamps 53 representing the time instants t$_1$, . . . , t$_N$ of a group of N transport packets $TP_1, \ldots, TP_N$ into a time stamp packet 147. The time stamp packet 147 further comprises a header portion 148 comprising identification information. It is noted that the transport packets 32 are not situated anymore at predetermined time instants on the time axis t. The sequence is repeated for each next group of N transport packets 32 (resulting in a second time stamp packet 147 and a corresponding group of N transport packets $TP_{N-1}, \ldots, TP_{2N}$). In order to be able to associate a specific transport packet 32 with the corresponding time stamp 53, the order in which the time stamps 53 are stored in the time stamp packet 147 is equal to the order in which the corresponding transport packets 32 are arranged.

Figure 16C:
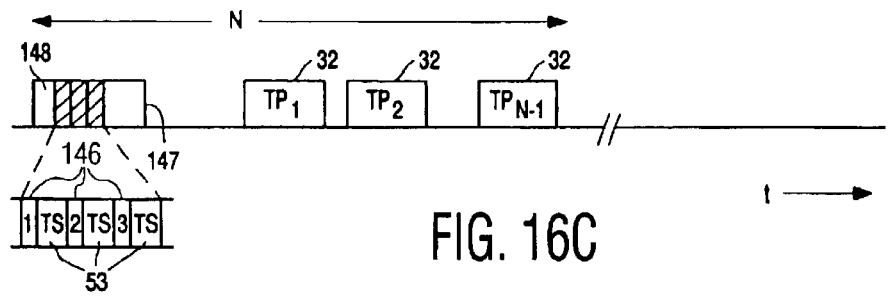

An alternative, second method of grouping time stamps is illustrated in FIG. 16C. Each time stamp 53 within the time stamp packet 147 is preceded with specific association information 146 for associating a specific time stamp 53 with the corresponding transport packet 32. This has the advantage that the order in which the transport packets 32 are arranged is free to choose. Further, at a receiver site, missing or corruption of a specific transport packet can be better dealt with.

Figure 16D:
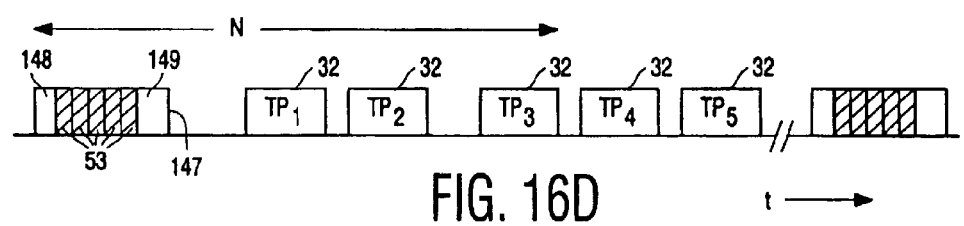

FIG. 16D shows a slightly different embodiment for grouping time stamp packets according to the invention. Only a predetermined number of time stamps 53 are collected in a time stamp packet 147. This number is determined by the number of transport packets 32 that can be processed simultaneously by specific coding or decoding methods of data, such as, for example, block-wise error correction. Due to the predetermined number of times stamps 53 that are allowed to be stored in one time stamp packet 147, the remaining space 149 might be filled with stuffing bits. The header portion 148 comprises information relating to the number of time stamps stored in the time stamp packet TSP (N=5).

Figure 16E:
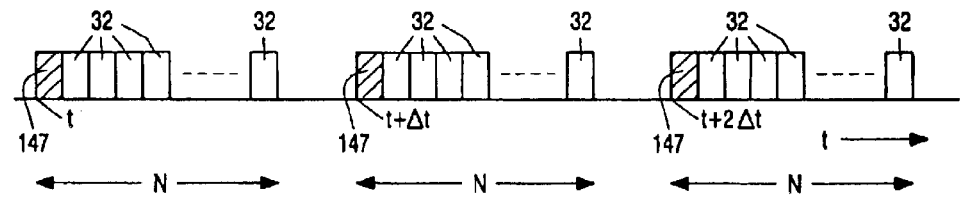

FIG. 16E illustrates yet another method according to the invention for grouping time stamps. A time stamp packet 147, which may have the format of one of the preceding time stamp packets, is also used for synchronization at a receiver site. The several time stamp packets 147 are transmitted at, for at least most of the time, regular time instants t, t+Δt, t+2Δt, etc. In the case of adding stuffing bytes to the time stamp packet, the time instants may occur locally irregular. These may be used to synchronize, for instance, a recording device, such as, for example, a magnetic tape device. Note that the above mentioned time instants are not related to the time instants depicted in FIG. 16A.

Figure 16F:
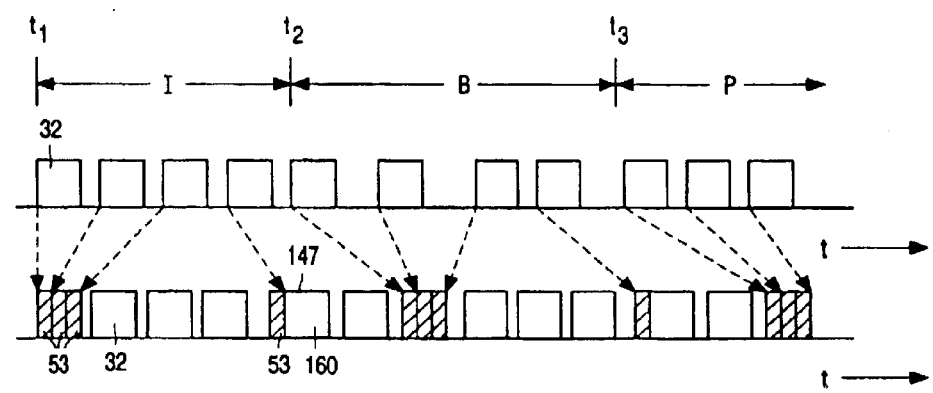

FIG. 16F shows a sequence of transport packets 32 representing video pictures according to MPEG-2 video coding. A first group I of transport packets 32 constitutes a reference I-picture, a second group B constitutes a bi-directional prediction B-picture, and a third group P constitutes a forward prediction P-picture. The first transport packet in a I-, B- or P-picture corresponds to the first time stamp 53 in a time stamp packet 147. This implies that stuffing bytes 160 may be necessary for an incomplete time stamp packet 147.

Figure 16G:
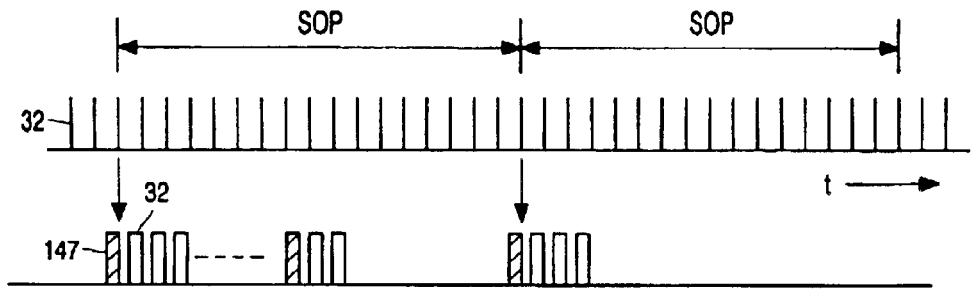

FIG. 16G shows a sequence SOP of transport packets 32 representing video pictures arrange in so-called group-of-pictures GOPs, as known from MPEG-2 video coding. The time stamps within a time stamp packet 147 are all referring to transport packets 32 within one group of pictures.

Figure 17A:
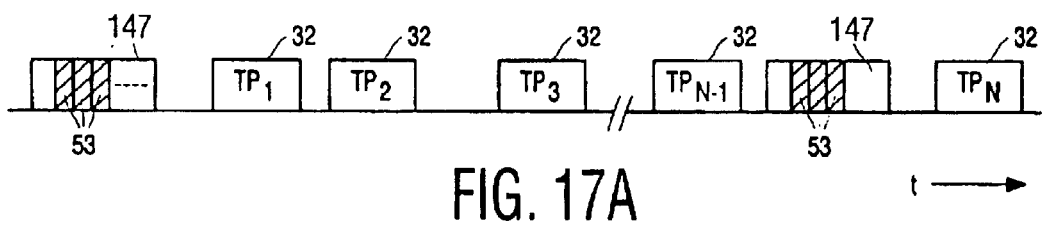
FIGS. 17A and 17B illustrate the result of separating time stamps of a non real time stream according to the method illustrated in FIG. 15.
Figure 17B:
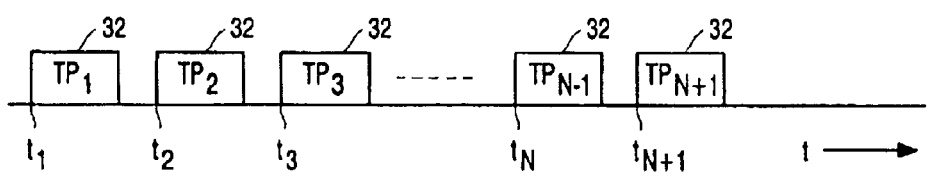

FIGS. 17A and 17B illustrate the separating of time stamps 53 according to the method as illustrated in FIG. 14. FIG. 17A shows a non-real-time stream of both time stamp packets 147 and transport packets 32 along the time axis t.

FIG. 17B shows the converted real-time stream of transport packets 32, such as obtained by the method illustrated in FIG. 14. The information stored in the time stamps 53 of the time stamp packet 147 is used to determine the original time instants ti at which the transport packets 32 have been received originally.

Figure 18:
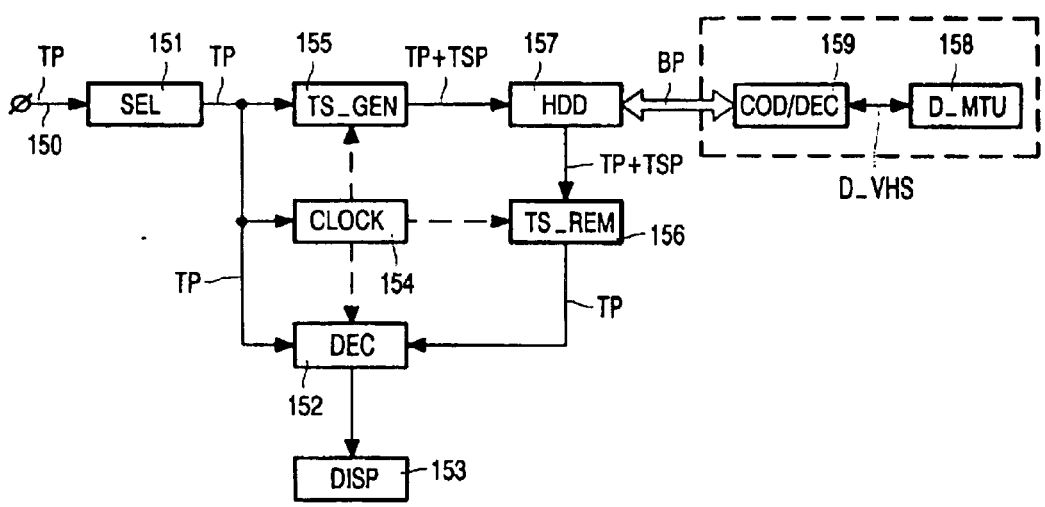
FIG. 18 shows a system according to the invention for storage and retrieval of a real time stream of information signals.

FIG. 18 shows a system according to the invention for storage and retrieval of real time stream of information signals. At an input terminal 150, a real-time stream of, for example, transport packets TP, in case of an MPEG stream, is received. Selected transport packets TP corresponding to a specific program stream, are selected by selecting means 151. The selected transport packets TP may be further directed to suitable decoding means 152, such as, for example, a MPEG decoder. The decoding means 152 is further adapted to generate a display or audio signal for a reproduction device 153, such as, for example, a television device. Clock reference information present in the received real time stream, such as, for example, PCR values in case of MPEG-2 transport packets, is inputted to a clock circuit 154. This clock circuit 154 supplies synchronization signals to the decoding means 152, time stamp generating means 155 and time stamp removing means 156. The time stamp generating means 155 is described in more detail in FIG. 13 while the time stamp removing means 156 is described in more detail in FIG. 15. However, the clock circuits in both embodiments are combined in the clock circuit 154. Further, the transmission means in FIG. 13 and the receiving means in FIG. 15 are not necessarily adapted for an IEEE-1394 bus, but may be adapted for connection to a hard disk drive 157 via, for example, a SCSI interface. The non-real-time stream of transport packets TP and time stamp packets TSP generated with the time stamp generating means 155, are temporally stored in the hard disk drive 157. The hard disk drive 157 is connected by means of an IEEE-1394 bus with a digital magnetic tape unit 158 via suitable coding and decoding means 159. The transport packets TP and time stamp packet TSP stored at the hard disk drive 157 are transferred in bursts to or from the digital magnetic tape unit 158 employing the bus protocol with bus packets BP. The format employed between the coding and decoding means 159 and the digital magnetic tape unit 158 may be according to the D-VHS STD format as illustrated in FIG. 10.

Although the invention has been described with reference to preferred embodiments thereof, it is to be understood that these are not limitative examples. Thus, various modifications may become apparent to those skilled in the art, without departing from the scope of the invention, as defined by the claims. Further, the invention lies in each and every novel feature or combination of features.

LIST OF DOCUMENTS (D1) International Patent Application WO 96/30905, corresponding to U.S. Pat. No. 5,953,483 (PHN 15.260)
(D2) Grand Alliance HDTV System Specification, Feb. 22, 1994: Chapters V and VI
(D3) High Performance Serial Bus P1394, draft 7.1, version 1 issued Aug. 5, 1994, IEEE standard department
(D4) European Patent Application EP-A 0 858 230 A1, corresponding to U.S. Pat. No. 5,579,183 (PHN 14.818)
(D5) International Patent Application WO 96/01540, corresponding to U.S. Pat. No. 5,689,507 (PHN 14.935)

What is claimed is:

1. A method of converting a packetized stream of information signals representing information arranged in separate, consecutive data packets of digital format, into a stream of information signals with time stamps, the method comprising the steps:

receiving the serial stream of information signals;

detecting the data packets in the serial stream of information signals, and establishing a time of arrival of each detected data packet; and generating time stamp data related to the time of arrival for each detected data packet;

characterized in that the method further comprises the steps:

grouping a plurality of the time stamp data of several data packets into a time stamp packet;

generating a time stamp packet signal representing the time stamp data packet and transmitting the serial stream of the received information signals together with the generated time stamp packet signals such that a unique association is established between the time stamp data and a corresponding data packet.

2. The method as claimed in claim 1, wherein each data packet comprises a fixed number of N digital data units, and the time stamp data for each data packet comprises M digital data units, where M≦N, characterized in that each time stamp packet comprises N digital data units.

3. The method as claimed in claim 1, characterized in that each time stamp packet comprises identifying information.

4. The method as claimed in claim 1, characterized in that each time stamp data in the time stamp packet comprises associating information indicating the corresponding data packet.

5. The method as claimed in claim 1, characterized in that said grouping step comprises grouping the plurality of the time stamp data within a time stamp packet in an order in accordance with an order of transmission of the corresponding data packets.

6. The method as claimed in claim 1, characterized said grouping step comprises grouping only those time stamp data into a time stamp packet which correspond to data packets which constitute with the time stamp packet, a logical block of combined data packets as employed for coding or decoding purposes.

7. The method as claimed in claim 6, characterized in that the logical block of combined data packets corresponds to a block as employed for error coding or error correction.

8. The method as claimed in claim 6, wherein a sequence of data packets represents a coded video picture, characterized in that the first data packet of a picture corresponds with the first data packet of a logical block of data packets.

9. The method as claimed in claim 6, wherein a sequence of data packets represents a coded video picture, characterized in that the logical block of data packets are selected in accordance with a group of video pictures.

10. The method as claimed in claim 1, characterized in that said transmitting step comprises transmitting the time stamp packet signals for time synchronization of a receiving device with a transmitting device via a transmission channel.

11. The method as claimed in claim 6, characterized in that said transmitting step comprises transmitting a synchronization signal preceding transmission of a logical block of data packets.

12. The method as claimed in claim 1, wherein the data packets are formatted according to a MPEG transport stream packet of N=188 bytes, characterized in that said grouping step comprises grouping time stamp data into a time stamp packet of N=188 bytes.

13. A method of converting a serial stream of information signals representing information arranged in separate, consecutive data packets of digital format and time stamp packets signals generated by the method as claimed in claim 1, into a packetized stream of information signals, characterized in that said method comprises the steps:

receiving the serial stream of information signals and time stamp packet signals;

detecting the time stamp packet signals;

separating the time stamp signals from the detected time stamp packet signals;

associating a separated time stamp signal to an information signal of a corresponding data packet;

determining a time stamp on the basis of the separated time stamp signal;

generating a synchronization signal on the basis of the time stamp to obtain a transmission time of the data packet; and transmitting the information signal representing the data packet synchronized by the generated synchronization signal.

14. The method as claimed in claim 13, characterized in that said detecting step comprises detecting the time stamp packet signals on the basis of identifying information accompanying the time stamp packet signals.

15. The method as claimed in claim 13, characterized in that said associating step comprises associating a separated time signal to an information signal of a corresponding data packet on the basis of associating information accompanying the corresponding data packet.

16. The method as claimed in claim 13, characterized in that said associating step comprises associating a separated time signal to an information signal of a corresponding data packet on the basis of the received order of the time stamps.

17. The method as claimed in claim 13, characterized in that said generating step comprises time synchronizing on the basis of a received time stamp packet signal.

18. A converter for converting a packetized stream of information signals, representing information arranged in separate, consecutive data packets of digital format, into a stream of information signals with time stamps, said converter comprising:

an input terminal for receiving the serial stream of information signals;

detecting means for detecting the data packets in the received serial stream of information signals;

timing means for establishing a time of arrival of the detected data packets; and time stamp generating means for generating time stamp data related to the time of arrival;

characterized in that the converter further comprises;

grouping means for grouping a plurality of the generated time stamp data into a time stamp packet;

time stamp packet signal generating means for generating a time stamp packet signal representing the time stamp packet; and transmitting means for transmitting the serial stream of received information signals together with the generated time stamp packet signals such that a unique association is established between time stamp data and the corresponding data packet.

19. The converter as claimed in claim 18, wherein the converter processes data packets comprising a fixed number of N digital data units, and the time stamp signal generating means generates time stamp data comprising M digital data units, where with M≦N, characterized in that the time stamp packet signal generating means generates a time packet signal representing a packet of time stamp data comprising N digital data units.

20. The converter as claimed in claim 18, characterized in that the time stamp packet signal generating means provides the time stamp data packet with identifying information.

21. The converter as claimed in claim 18, characterized in that the time stamp packet signal generating means provides each time stamp in the time stamp data packet with associating information indicating the corresponding data packet.

22. The converter as claimed in claim 18, characterized in that the grouping means orders the plurality of the time stamp data within a time stamp data packet in accordance with the order of transmission of the corresponding data packets by the transmission means.

23. The converter as claimed in claim 18, characterized in that the grouping means groups, into a time stamp data packet, only those time stamp data which correspond to data packets which constitute, with the time stamp data packet, a logical block of combined data packets as employed for coding or decoding purposes.

24. The converter as claimed in claim 23, characterized in that the logical block of data packets corresponds to a block as employed for error coding or error correction.

25. The converter as claimed in claim 23, wherein a sequence a data packets represents a coded video picture, characterized in that the first data packet of a picture corresponds with the first data packet of a logical block of data packets.

26. The converter as claimed in claim 23, wherein a sequence of data packets represents a coded video picture, characterized in that the logical block of data packets are selected in accordance with a group of video pictures.

27. The converter as claimed in claim 18, characterized in that the transmission means transmits the time stamp packet signal for time synchronization of a receiving device via a transmission channel.

28. The converter as claimed in claim 24, characterized in that the transmission means transmits a synchronization signal preceding transmission of a logical block of data packets.

29. The converter as claimed in claim 18, characterized in that the converter receives and transmits information signals representing data packets formatted according to MPEG transport stream packets of N=188 bytes and to group the time stamp data into a time stamp data packet of N=188 bytes.

30. A converting device for converting a stream of information signals representing information arranged in separate, consecutive data packets of digital format with time stamp packet signals generated by the method as claimed in claim 1, into a packetized stream of information signals, characterized in that the converting device comprises:

an input terminal for receiving the serial stream of information signals and time stamp packet signals;

detecting means for detecting the received time stamp packet signals;

separating means for separating the time stamp signals from the detected time stamp packet signals;

associating means for associating a separated time stamp signal with an information signal representing a corresponding data packet;

determining means for determining a time stamp on the basis of the separated time stamp signal;

generating means for generating a synchronization signal on the basis of the time stamp representing a transmission time of the data packet; and transmission means for transmitting the information signal representing the data packet synchronized by the generated synchronization signal.

31. The converting device as claimed in claim 30, characterized in that the detecting means detects the received time stamp signals on the basis of identifying information accompanying the time stamp data packet.

32. The converting device as claimed in claim 30, characterized in that the associating means associates a separated time stamp signal with an information signal of a corresponding data packet on the basis of associating information accompanying the time stamp signal.

33. The converting device as claimed in claim 30, characterized in that the associating means associates a separated time signal with an information signal of a corresponding data packet on the basis of the received order of the time stamps.

34. The converter as claimed in claim 30, characterized in that the transmission means synchronizes in time on the basis of a time stamp packet signal.

35. A system for storage and retrieval of a packetized stream of information signals representing information arranged in separate, consecutive data packets of digital format, the system comprising:

an input terminal for receiving the information signals;

a converter for converting a packetized stream of information signals, representing information arranged in separate, consecutive data packets of digital format, into a stream of information signals with time stamps, connected to the input terminal, said converter comprising:

an input terminal for receiving the serial stream of information signals;

detecting means for detecting the data packets in the received serial stream of information signals;

timing means for establishing a time of arrival of the detected data packets; and time stamp generating means for generating time stamp data related to the time of arrival; characterized in that the converter further comprises:

grouping means for grouping a plurality of the generated time stamp data into a time stamp packet;

time stamp packet signal generating means for generating a time stamp packet signal representing the time stamp packet; and transmitting means for transmitting the serial stream of received information signals together with the generated time stamp packet signals such that a unique association is established between time stamp data and the corresponding data packet;

storage means connected to the converter for storing converted signals outputted by the converter;

a converting device, as claimed in claim 30, connected to the storage means for receiving the stored signals; and an output terminal connected to the converting device for outputting signals converted by the converting device.

36. The system as claimed in claim 35, characterized in that, the converter and the converting device are connected to the storage means with a bus for transporting signals according to the same format as the received information signals.

37. The system as claimed in claim 36, wherein the system receives information signals representing packets formatted according to a MPEG transport stream packet of N=188 bytes, characterized in that the interconnecting bus transports signals representing packets of N=188 bytes.

38. A system for storage and retrieval of a packetized stream of information signals representing information arranged in separate, consecutive data packets of digital format, the system comprising:

an input terminal for receiving the information signals;

general data processing means connected to the input terminal for converting signals using a method of converting a packetized stream of information signals representing information arranged in separate, consecutive data packets of digital format, into a stream of information signals with time stamps, the method comprising the steps:

receiving the serial stream of information signals;

detecting the data packets in the serial stream of information signals, and establishing a time of arrival of each detected data packet; and generating time stamp data related to the time of arrival for each detected data packet;

characterized in that the method further comprises the steps:

grouping a plurality of the time stamp data of several data packets into a time stamp packet;

generating a time stamp packet signal representing the time stamp data packet and transmitting the serial stream of the received information signals together with the generated time stamp packet signals such that a unique association is established between the time stamp data and a corresponding data packet;

storage means connected to the general data processing means for storing converted signals outputted by the general data processing means;

the general data processing means being further connected to the storage means for receiving and converting the stored signals using the method as claimed in claim 13; and an output terminal connected to the general data processing means for outputting the stored and converted signals.

39. A record carrier having stored thereon a packetized stream of information signals comprising data packets and time stamp packets formed by the method as claimed in claim 1.

40. A method for transmitting a packetized stream of information signals representing information arranged in separate, consecutive data packets of digital format, across a transmission bus adapted for transporting signals according to the digital format of the packetized stream of information signals, characterized in that the method comprises the steps:

converting the packetized stream of information signals into a stream of information signals with time stamp signals using a method of converting a packetized stra of information signals representing information arranged in separate, consecutive data packets of digital format, into a stream of information signals with time stamps, the method comprising the steps:

receiving the serial stream of information signals;

detecting the data packets in the serial stream of information signals, and establishing a time of arrival of each detected data packet; and generating time stamp data related to the time of arrival for each detected data packet;

characterized in that the method further comprises the steps:

grouping a plurality of the time stamp data of several data packets into a time stamp packet;

generating a time stamp packet signal representing the time stamp data packet and transmitting the serial stream of the received information signals together with the generated time stamp packet signals such that a unique association is established between the time stamp data and a corresponding data packet; and transmitting this stream of information signals with time stamp packets across the transmission bus.

* * * * *